United States Patent
Liu et al.

(10) Patent No.: US 6,574,664 B1
(45) Date of Patent: Jun. 3, 2003

(54) APPARATUS AND METHOD FOR IP AND MAC ADDRESS DISCOVERY AT THE PROCESS LAYER

(75) Inventors: Shuosen Robert Liu, San Jose, CA (US); Brian D Harrison, Scotts Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/240,205

(22) Filed: Jan. 29, 1999

(51) Int. Cl.[7] .......................................... G06F 15/173
(52) U.S. Cl. ........................................ 709/224; 709/228
(58) Field of Search ................................ 709/223, 224, 709/226, 228, 229, 249

(56) References Cited

U.S. PATENT DOCUMENTS

| | | | |
|---|---|---|---|
| 5,185,860 A | 2/1993 | Wu | 395/200 |
| 5,828,844 A * | 10/1998 | Civanlar et al. | 395/200.58 |
| 5,835,720 A | 11/1998 | Nelson et al. | 395/200.54 |
| 5,854,901 A | 12/1998 | Cole et al. | 395/200.75 |
| 5,982,753 A * | 11/1999 | Pendleton et al. | 370/252 |
| 6,101,188 A * | 8/2000 | Sekine et al. | 370/401 |

* cited by examiner

Primary Examiner—John A. Follansbee

(57) ABSTRACT

A method and apparatus for discovering IP and MAC addresses by an application program in a network. The network includes a number of SNMP-manageable and non-SNMP-manageable devices. Active devices can be discovered by the discovery node through a serial pinging mechanism which populates the MIB of the discovery node with IP and/or MAC addresses of all the devices on the network. An SNMP agent on the network is then used to perform a GetNext request that returns to the process layer the IP and MAC addresses of the non-SNMP manageable and SNMP-manageable devices.

14 Claims, 7 Drawing Sheets

APPARATUS AND METHOD FOR IP AND MAC ADDRESS DISCOVERY AT THE PROCESS LAYER

FIELD OF THE INVENTION

The present invention relates generally to digital communications. More particularly, the invention relates to network management.

BACKGROUND OF THE INVENTION

Networks are used to connect personal computers and workstations with file servers, print servers, modems, hubs, and other devices. Examples of such networks include Local Area Networks (LANs), metropolitan area networks, and wide area networks. These networks enable the personal computers and workstations to share information and resources.

Network protocols are used to define the manner in which devices or nodes communicate in a network. These protocols are designed in layers and FIG. 1 illustrates a four-layer model of an exemplary network 100. There is shown two network devices 102a, 102b, both of which can be computers. Each device 102 uses a process 104, transport 106, network 108, and data link layer 110 to exchange data with the other device 102. Application programs exist at the process layer 104 and communicate with the transport layer 106. The transport layer 106 provides reliable end-to-end data transfers, the network layer 108 provides connectionless and unreliable delivery of data, and the data link layer 110 is the hardware interface that enables the data transfer through the physical network 112.

Often, these networks use a network manager to manage operations of the devices on the network, to analyze resource performance, to identify and resolve faults, and to automate management tasks. In order for the network manager to perform these tasks, the network manager needs to discover the identity of the devices on the network. The identity of a device is typically associated with a unique Internet protocol (IP) address as well as a hardware address, such as a medium access control (MAC) address. The IP address is used to identify a device at the transport layer of the network and the MAC address is the hardware address that is used by the data link layer of the network. The IP address is often used at the process layer by various application programs and the MAC address is not directly accessible by these application programs.

Simple Network Management Protocol (SNMP) is a standard for network management that can be employed by the network manager to manage the devices on the network. Each SNMP-manageable device has a Management Information Base (MIB) that stores objects or variables representing different characteristics of a device including its IP and MAC addresses. The network manager discovers the identity of a device by sending a GetNext request to a SNMP-manageable device. The response returns the IP and/or MAC addresses.

Devices that do not support SNMP can be discovered by the Internet Control Message Protocol (ICMP). A network manager using ICMP discovers devices by performing what is commonly referred to as "pinging." The network manager sends an echo message to an address and waits for a response. If a response is returned, it contains the IP and MAC addresses of the device. However, only the IP address is returned to the process layer. The MAC address resides at the data link layer and is not directly accessible to an application program at the process layer.

Currently, there is a need for application programs to have access to both IP and MAC addresses in order to perform more complex operations. However, there is no method for obtaining both of these addresses for non-SNMP devices. The conventional pinging method cannot return to the application program the MAC address of a device. Additionally, the SNMP GetNext request cannot be used to obtain the IP and MAC addresses for non-SNMP-manageable devices. Accordingly, there is a need for a mechanism that can provide application programs at the process layer, the IP and MAC address of devices on a network.

SUMMARY OF THE INVENTION

The present invention pertains to a mechanism that discovers, at the process layer, the IP and MAC addresses of those devices or nodes connected to a local and/or remote network. A network includes a number of devices, which can be computers, hubs, routers, bridges, and the like. One of the nodes acts as a local discovery node having the capability to obtain or discover the IP and MAC addresses of the nodes on a local or remote network.

The local discovery node has an SNMP agent and a local and remote IP and MAC address discovery procedure. The SNMP agent allows the local discovery node to manage the devices in accordance with the SNMP protocol. The other devices on the local network need not have an SNMP agent. The local IP and MAC address discovery procedure is an application program residing at the process layer that obtains the IP and MAC addresses of each device on the local network. The remote IP and MAC address discovery procedure is an application program residing at the process layer that obtains the IP and MAC addresses of each device on a remote network.

The local IP and MAC address discovery procedure discovers the IP and MAC addresses of the devices on the local network by first "pinging" each of the devices. The procedure "pings" each of the IP addresses supported by the local network. Those devices that recognize their IP address respond by returning a message that indicates the IP and MAC addresses of the device. The IP and MAC addresses are stored in a table associated with the SNMP MIB. The IP address is returned to the local IP and MAC address discovery procedure and stored in an IP and MAC database that is accessible by other application programs.

Next, the local IP and MAC address discovery procedure uses the discovered IP addresses in a SNMP GetNext request to obtain the corresponding MAC addresses from the MIB. The procedure stores the MAC address in the IP and MAC database. The IP and MAC addresses can then be used by other application programs.

The remote IP and MAC address discovery procedure obtains the IP and MAC addresses of nodes on a remote network. One of the nodes on the remote network has an SNMP agent and an address translation table containing the IP and MAC addresses of the devices on the remote network. This remote node or remote discovery node is capable of sending a "ping" to devices on the remote network on demand from another device. The remote IP and MAC address discovery procedure runs on a device on the local network and makes requests to the remote discovery node to ping each address on the remote network. The remote IP and MAC address discovery procedure than reads the address translation table of the remote discovery node through the SNMP GetNext request. The obtained IP and MAC addresses are then stored in the IP and MAC database and can then be used by other application programs.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
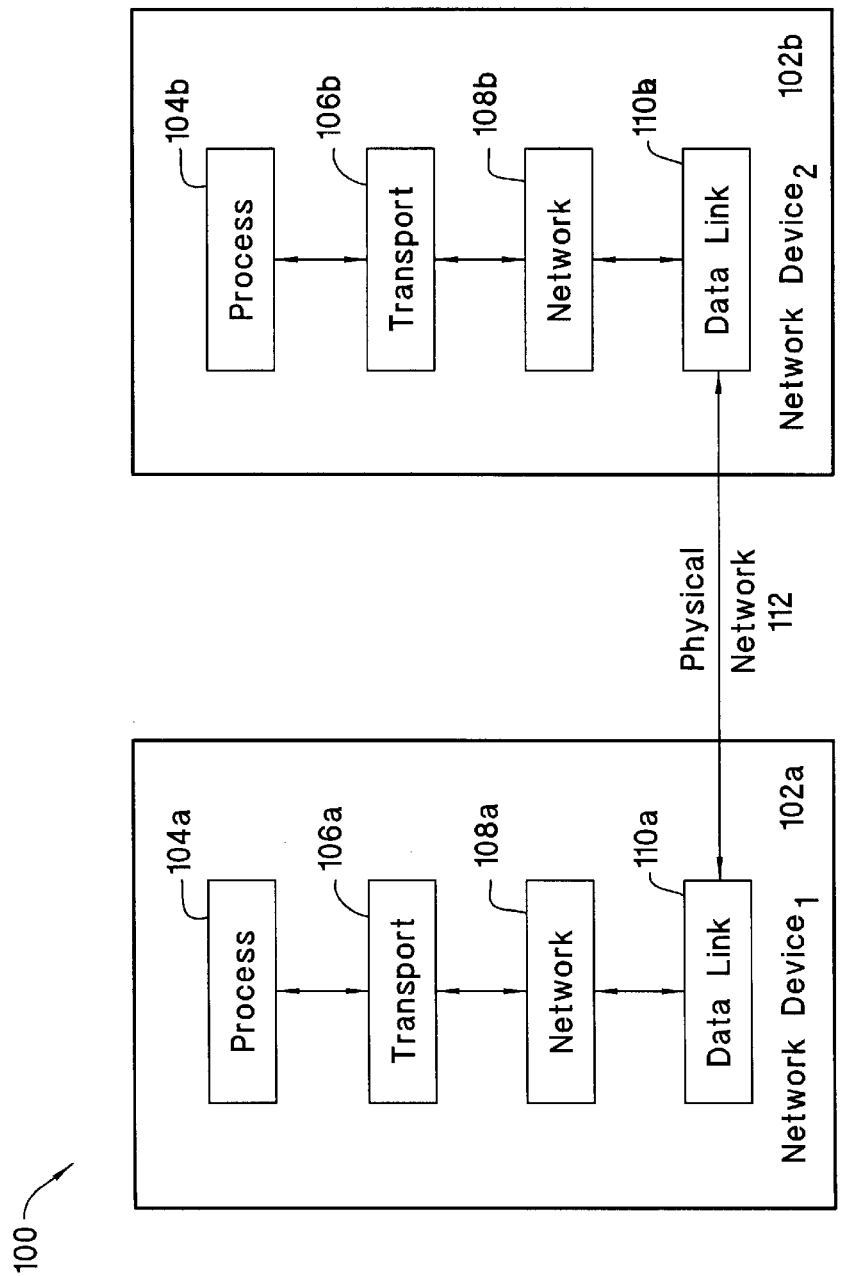
FIG. 1 illustrates a four-layer protocol model of an exemplary network.
Figure 2:
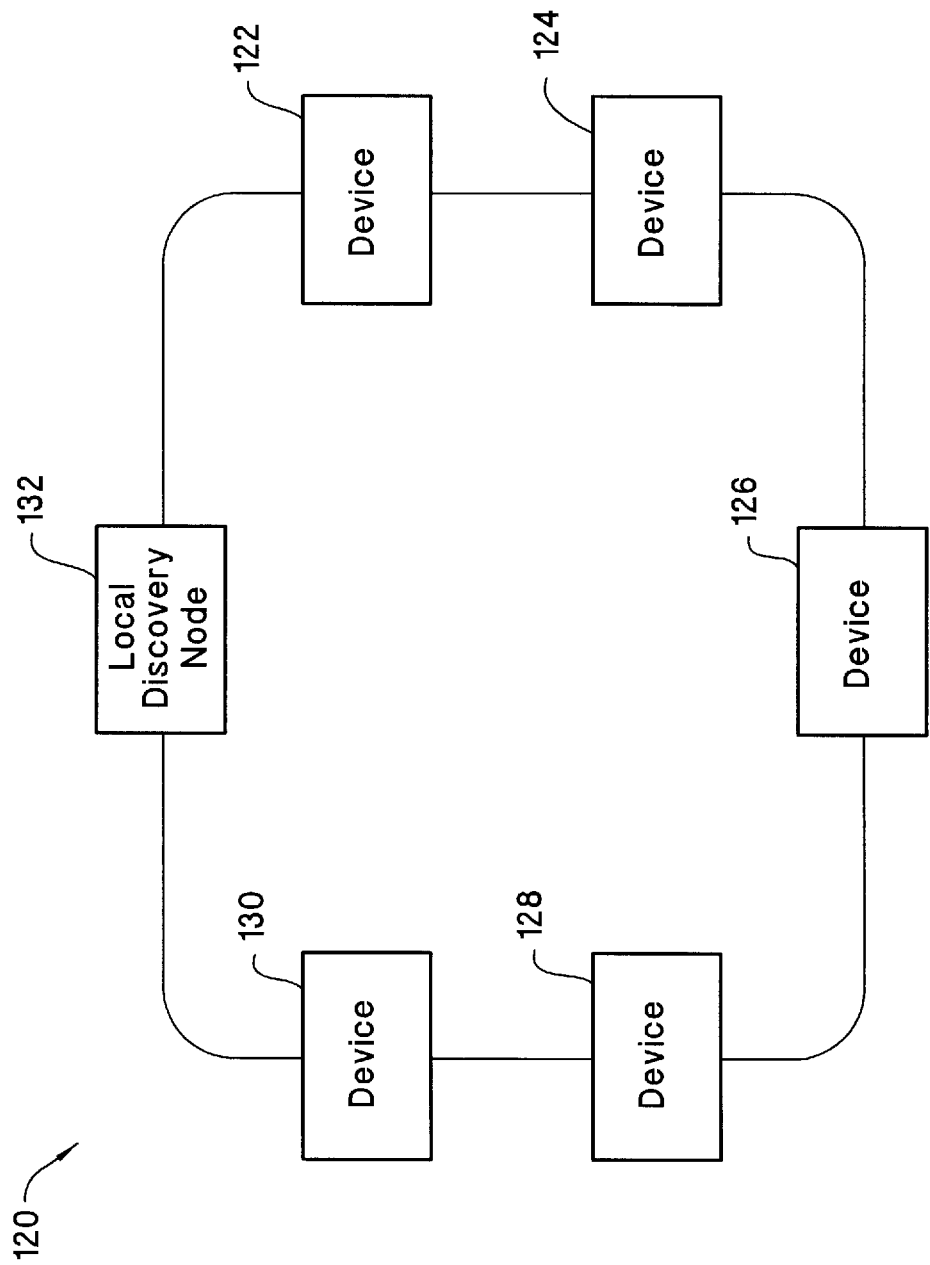
FIG. 2 is a schematic diagram illustrating a first exemplary network according to a first embodiment of the present invention.

FIG. 2 shows a network 120 which includes a number of network elements, devices, or nodes 122–132, one of which acts as the local discovery node 132. The discovery node 132 has the capability of determining the IP and MAC addresses of devices connected to the network 120. The network 120 can utilize any type of network topology, such as but not limited to, token ring, ethernet, X.25 and fiber-distributed data interface (FDDI). The devices 122–132 can be workstations, personal computers, hubs, printers, and the like.

Figure 3:
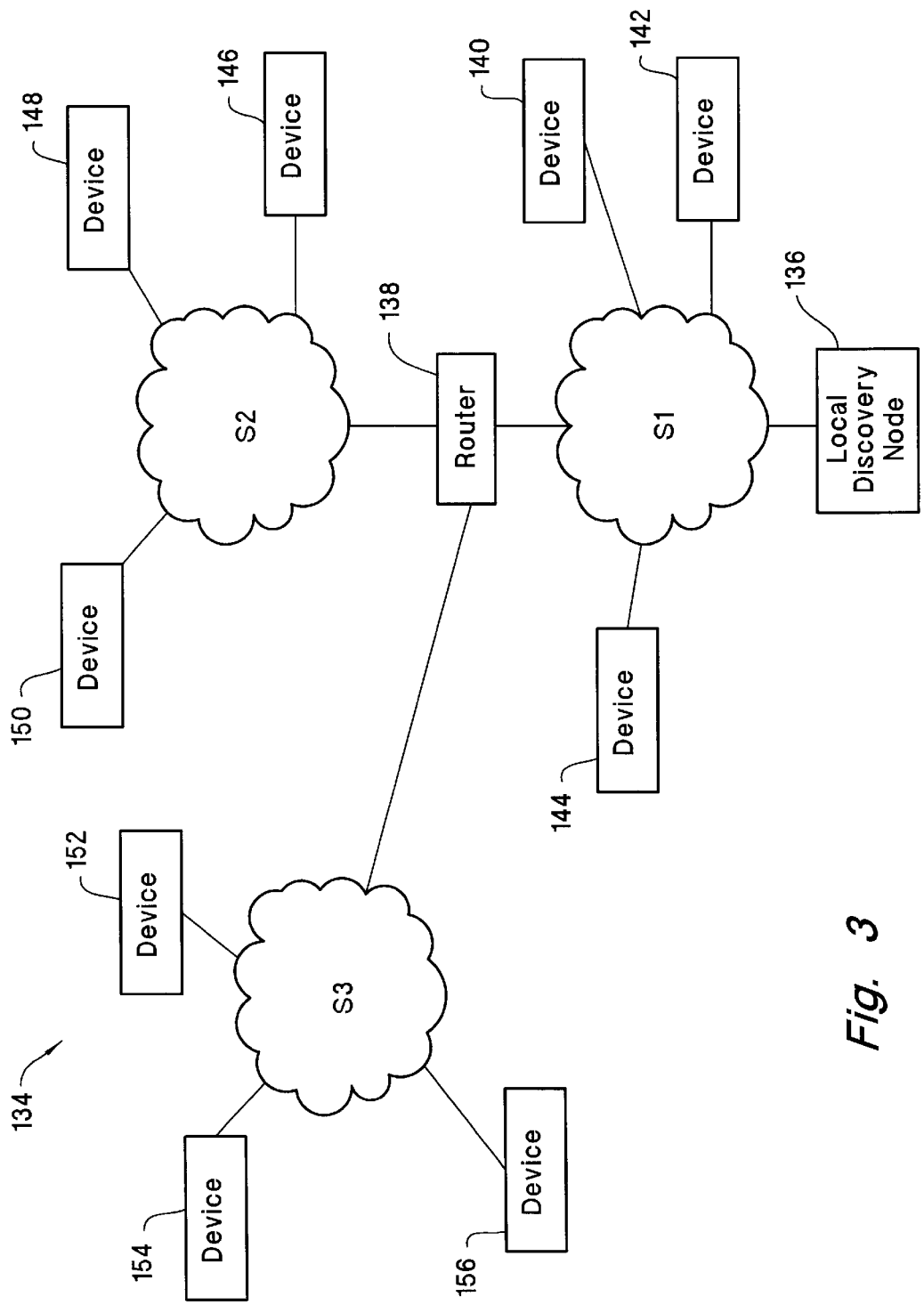
FIG. 3 is a schematic diagram illustrating a second exemplary network according to a second embodiment of the present invention.

FIG. 3 shows a second network 134 which includes a first, second, and third subnets S1, S2 and S3. The subnets can have the same topology or they can have different topologies. As noted above, the topologies can be, but are not limited to, token ring, ethernet, X.25 and fiber-distributed data interface (FDDI). The devices 136–156 can be workstations, personal computers, hubs, printers, and the like. A router 138 can be employed to interconnect the first, second, and third subnets, S1, S2, and S3. One of the devices can serve as the local discovery node 136.

The networks 120, 134 are scalable allowing additional devices to be added as needed. Preferably, the ethernet topology is used. Although FIGS. 2–3 show several devices, the networks 120, 134 can be composed of tens of thousands of addressable devices.

Figure 4:
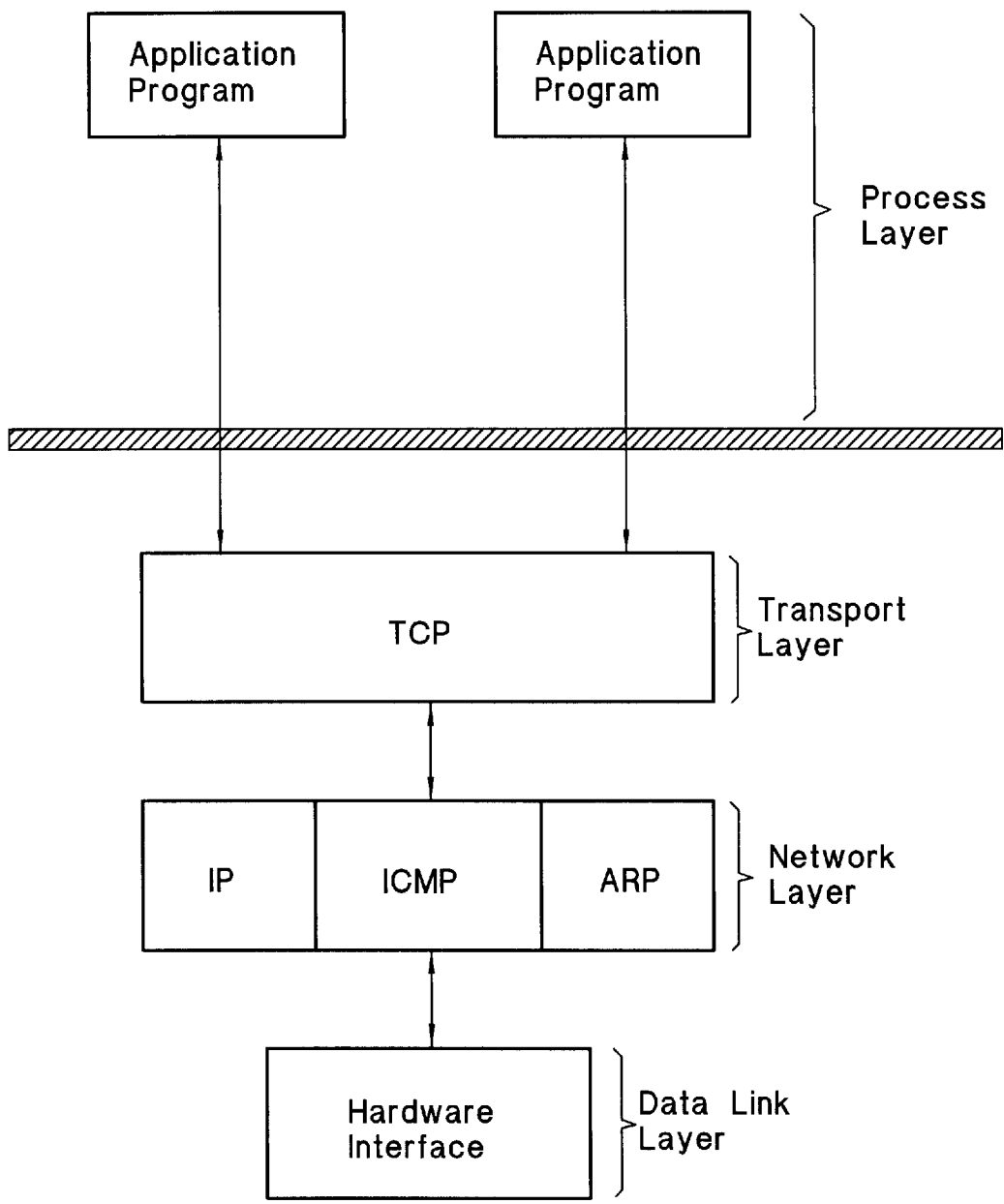
FIG. 4 illustrates a network protocol model for a device on the network in accordance with an embodiment of the present invention.

FIG. 4 illustrates the various protocols that can be used to transfer data between the devices in the network 120, 134. At the process layer, there are several application programs. The networks 120, 134 can use the transmission control protocol (TCP) at the transport layer, the internet protocol (IP), the internet control message protocol (ICMP), and the address resolution protocol (ARP) at the network layer.

The TCP/IP protocol is used to regulate how data is packaged into IP packets and transported between the devices. Each device has a physical address and a unique Internet protocol (IP) address. The IP address is an abstraction of the physical or hardware address. In the case where the network uses an ethernet topology, the physical address associated with each device is the MAC address. The MAC address is a unique 6 byte address that is used to identify a specific vendor-manufactured network interface card (NIC). The NIC is used to connect a device to an ethernet network.

The ARP layer is used by the IP layer to translate an IP address into its respective MAC address. The MAC address is then used in the delivery of the data packet to the intended device. The ARP layer performs the address resolution through dynamic binding. When a device A want to resolve the IP address of device B, $IP_B$, a broadcast message is sent on the network with IP address $IP_B$. Device B recognizes its IP address and responds with the physical address. An ARP cache is used to store those recently translated IP and MAC addresses in order to minimize the number of address translations that are performed at the ARP layer. However, the MAC addresses stored in the ARP cache cannot be accessed by an application program at the process layer.

The ICMP is used by the IP layer as an error reporting mechanism. One commonly used tool of the ICMP layer is the echo request and echo reply messages that are used in "pinging." In a typical ping operation, a device A initiates an ICMP echo request message to a device B. The ICMP echo request message is queued until the ARP layer determines the hardware address of device B. The ARP layer uses the IP address to determine the hardware address of device B as described above. Device B, upon recognizing its IP address, returns its hardware address to device A. The ARP layer stores the IP and hardware addresses of device B in the ARP cache. At this point, the ICMP echo request message is sent to device B which replies with an ICMP echo reply indicating the operational status of device B.

A more comprehensive discussion on each of the network protocols discussed above can be found in Douglas E. Comer, *Internetworking with TCP/IP Volume I Principles, Protocols, and Architecture*, second edition, Prentice Hall (1991), and W. Richard Stevens, *UNIX Network Programming*, Prentice Hall (1990), both of which are hereby incorporated by reference as background information.

The local discovery node 132, 136 uses SNMP to discover the devices on the network. SMNP is an application program that provides multi-vendor, interoperable network management. Each SNMP device is associated with a MIB that stores objects and/or variables representing different characteristics of a resource. The MIB is composed of a number of tables that are scattered through out the various network protocol layers. The MIB includes an "atTable" which is in essence, the ARP cache. An exemplary atTable is shown below as Table 1.

TABLE 1

| AtIfIndex | AtPhysAddress | AtNetAddress |
|---|---|---|
| 1 | 11-33-56-77-99-0C | 15.60.20.15 |
| 1 | 12-34-56-78-9A-BC | 15.60.20.16 |
| ... | ... | ... |

Each entry in the atTable includes an index (referred to as atIfnIndex), the MAC address of a device (referred to as atPhysAddress), and the IP address of the device (referred to as atNetAddress). A SNMP-manageable device can read the atTable by using the SNMP GetRequest or GetNext command.

A more comprehensive discussion on SNMP can be found in William Stallings, *SNMP, SNMPv2 and RMON Practical Network Management*, second edition, Addison-Wesley Publishing Company (1996), which is hereby incorporated by reference as background information.

Figure 5:
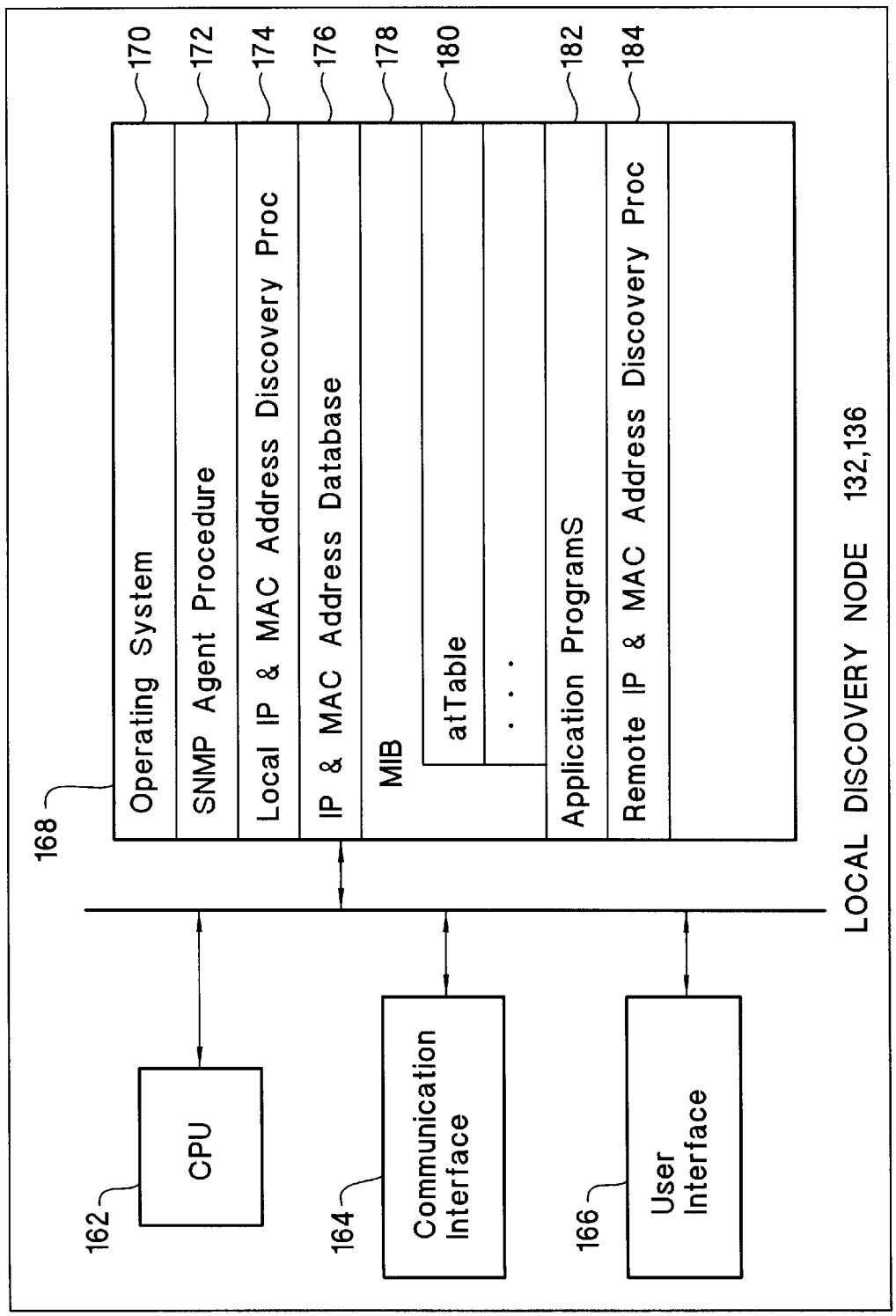
FIG. 5 is a block diagram of the discovery node in accordance with an embodiment of the present invention.

FIG. 5 shows the local discovery node 132, 136 in more detail. The local discovery node 132, 136 can be a workstation, personal computer, mainframe, or other type of processing device. The local discovery node 132, 136 has a central processing unit (CPU) 162, a communication interface 164 that interconnects the local discovery node 132, 136 to a network, a user interface 166, and a memory 168. The communications interface 164 can be used to communicate with other computers, networks, or system resources. The user interface 166 typically includes a keyboard and a display device, and may include additional resources such as a pointing device and a printer. The memory 168 may be implemented as random access memory (RAM) or a combination of RAM and non-volatile memory such as magnetic disk storage. The local discovery node 132, 136 has other system resources which are not shown.

The memory 168 can include the following:

- an operating system 170, such as but not limited to Microsoft (MS) Windows 98, MS Windows NT, any one of the UNIX-based operating systems, and the like;
- a SNMP agent procedure 172;
- a local IP and MAC address discovery procedure 174 that obtains the IP and MAC addresses of non-SNMP manageable and SNMP-manageable devices on a local network;
- an IP and MAC address database 176 that stores the IP and MAC addresses obtained by the local IP and MAC address discovery procedure 174;
- a MIB 178 that includes an atTable 180 and other tables;
- one or more application programs 182;
- a remote IP and MAC address discovery procedure 184 that obtains the IP and MAC addresses of devices on a remote network;
- as well as other programs, modules, data structures, and the like.

The foregoing description has described the architecture and components of the network in the preferred embodiments of the present invention. Attention now turns to the manner in which the local and remote IP and MAC address discovery procedures 174, 184 obtains the IP and MAC addresses of the devices on the network.

Figure 6:
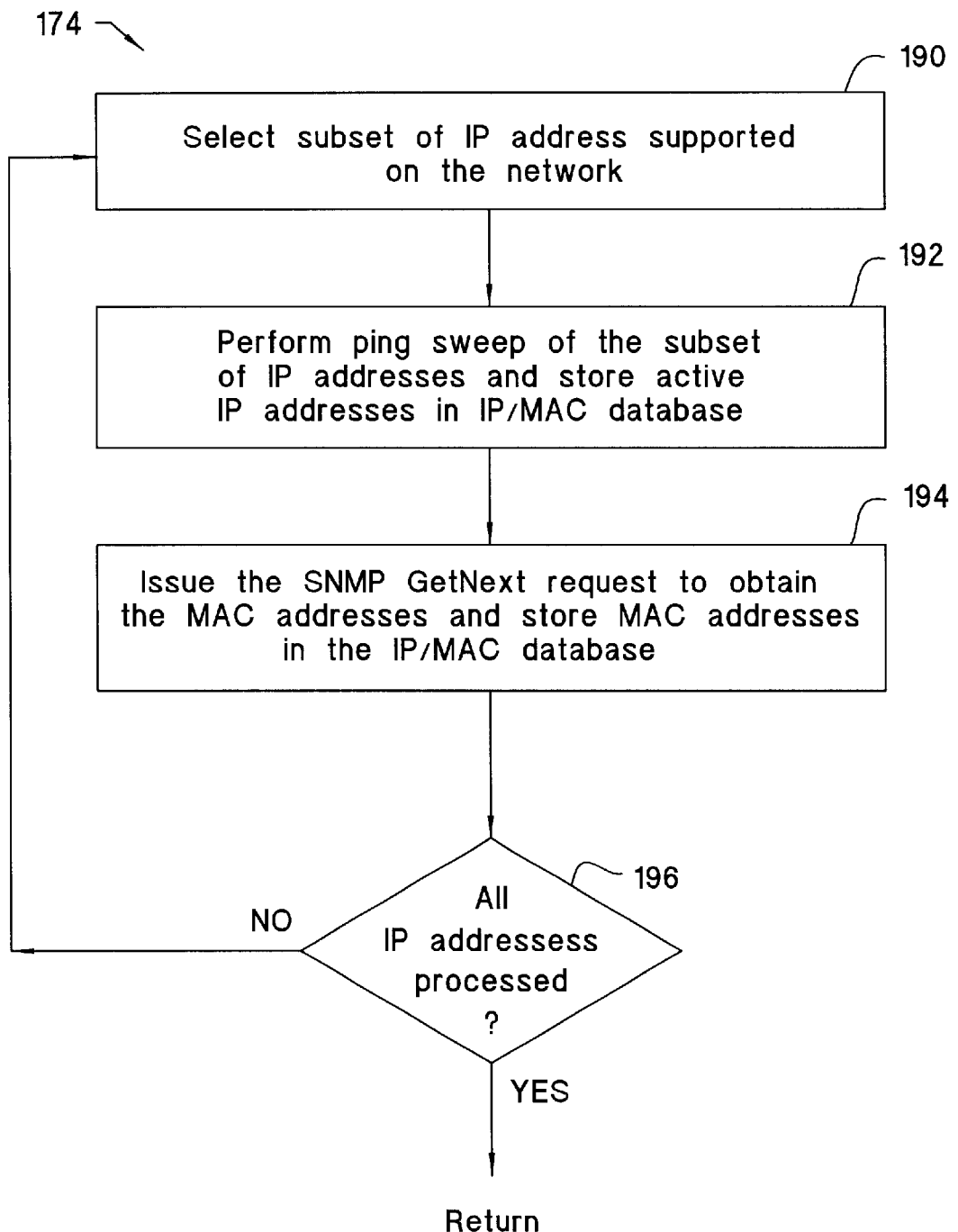
FIG. 6 is a block diagram showing the steps used by the local IP and MAC address discovery procedure to discover IP and MAC addresses in accordance with an embodiment of the present invention.

FIG. 6 illustrates the steps used by the local IP and MAC discovery procedure 174 to determine the IP and MAC addresses for those devices on a network. As noted above, the discovery node 132, 136 has a SNMP agent. However, the other devices on the network are not required to have an SNMP agent and the present invention works for both non-SNMP manageable devices as well as SNMP-manageable devices.

The local IP and MAC discovery procedure 174 needs to determine which IP addresses are active. In the case of a class C network, such as an ethernet LAN, the network can support up to 255 IP addresses, but not all of the 255 IP addresses may be active. A class A network can support up to $2^{24}$ or 16,777,216 IP addresses. Furthermore, the atTable 180 has room for a limited number of entries and as such, is refreshed on a periodic basis in order to store the most recently used entries. Due to the large number of IP addresses available and the space limitation of the atTable 180, the procedure 174 executes bursts of IP addresses at a time. A burst is a subset or a predefined number of the IP addresses supported on a network. By operating on a select number of IP addresses at one time, the procedure 174 can obtain the corresponding MAC addresses before they are deleted from the atTable 180.

For each device on the network, the local IP and MAC address discovery procedure 174 selects a first subset of IP addresses (step 190). The procedure 174 starts at an initial IP address and increments this initial IP address to obtain the burst or predefined number of consecutive IP addresses.

For these IP addresses, the procedure 174 performs a ping sweep (step 192). As noted above, a ping sweep includes the activation of an ICMP echo request message for each IP address. The ICMP echo request message is queued while the ARP layer attempts to translate the IP address to a MAC address. If there is an active device associated with the IP address, the device responds with its MAC address which is then stored in the atTable 180. The ICMP echo request is then transmitted to the intended MAC address and an ICMP echo reply is returned with the device's IP address. The IP address is returned to the procedure 174 and stored in the IP and MAC address database 176. The procedure 174 then proceeds with the next incremental IP address until it has swept through all the IP addresses in the selected subset.

Next, the local IP and MAC address discovery procedure 174 obtains the MAC address of each active device on the local IP network by reading each entry of the atTable 180 (step 194). The procedure 174 reads each entry of the atTable 180 through the SNMP GetNext request. For example, an exemplary format of such a request can be as follows:

GetNext (discovery node, atPhysAddress, &mac_address, atNetAddress, &ip_address)

The GetNext request can return the IP address (&ip_address) and the MAC address (&mac$_{13}$ address). If the IP address matches any of the IP addresses in the IP and MAC address database 176 then the corresponding MAC address returned from the GetNext request is inserted into the IP and MAC address database 176 (step 194).

If the procedure 174 has not processed all the IP addresses supported by the network (step 196-NO), then the next subset of addresses is selected (step 190) and steps 192–194 are performed to discover active IP and MAC addresses. These steps are repeated until each IP address is pinged or processed (step 196-YES).

The remote IP and MAC address discovery procedure 184 discovers the IP and MAC addresses of nodes associated with a remote network. For example, referring to FIG. 3, the remote IP and MAC address discovery procedure 184 executing on local discovery node 136 can obtain the IP and MAC addresses of the devices connected to subnetworks S2 and S3. In order for this to occur, one of the nodes on the remote network acts as a remote discovery node. For example, node 148 on S2 or node 154 on S3 can act as a remote discovery node. The remote discovery node has an SNMP agent procedure and an address translation table containing the IP and MAC addresses of those nodes or devices on the remote network. The local discovery node 136 then reads the address translation table of the remote discovery node through the SNMP GetNext request in order to obtain the IP and MAC addresses for those nodes in the subnetwork.

Figure 7:
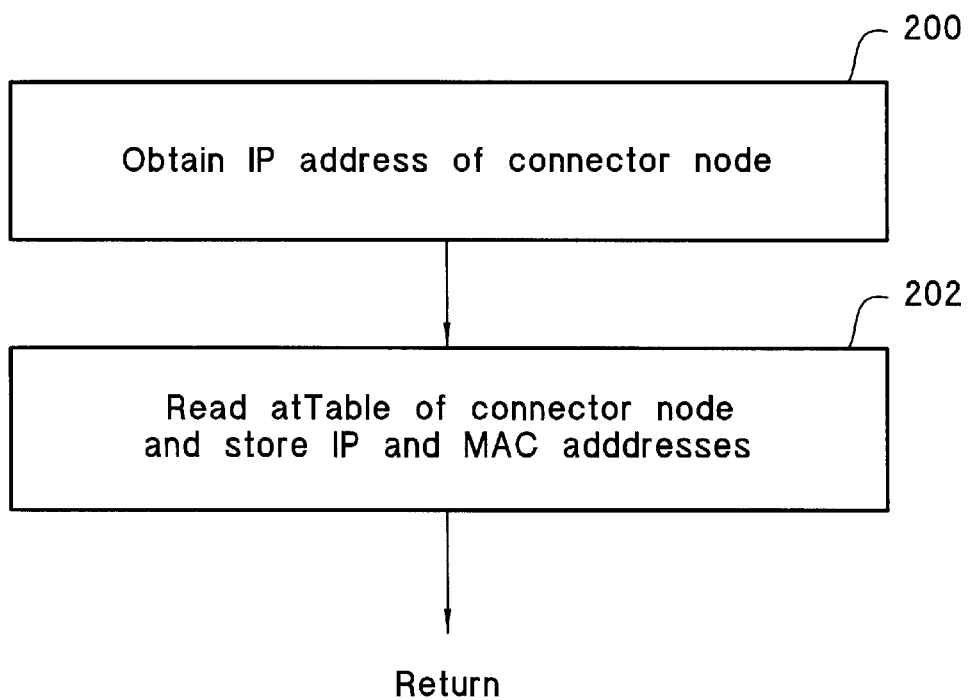
FIG. 7 is a block diagram showing the steps used by the remote IP and MAC address discovery procedure to discover the IP and MAC addresses in accordance with an embodiment of the present invention.

FIG. 7 illustrates the steps used by the remote IP and MAC address discovery procedure 184. Initially, the procedure 184 obtains the IP address of the remote discovery node (step 200). The IP address of the remote discovery node can be obtained from the execution of the local IP and MAC address discovery procedure 174 on the remote discovery node or by any other means for discovering IP addresses. Furthermore, the remote discovery node can receive a request from the local discovery node to initiate this discovery process.

Next, the remote IP and MAC address discovery procedure 184 reads the atTable, or address translation table, of the remote discovery node through the SNMP GetNext request (step 202). An exemplary format of such a request can be as follows:

GetNext (remote discovery node, atPhysAddress, &mac$_{13}$ address, atNetAddress, &ip$_{13}$ address)

The IP and MAC addresses returned are stored in the IP and MAC database 176 (step 202) and can be used by one or more application programs 182.

It should be noted that the local and remote IP and MAC address discovery procedures 174, 184 can be executed at any time by the discovery node 132, 136 and in some cases can be executed more than once. This need may exist due to the addition or deletion of devices on the network.

Once the IP and MAC address discovery procedures 174, 184 discover the IP and MAC addresses of the devices on the local and/or networks, an application program can use this information to perform a variety of operations not typically performed at the process layer. For instance, an application program that needs to boot up a networked device that is powered-off can do so if the application program knows the IP and MAC addresses of the device. This remote power-on is done at times in order to perform system maintenance and the like. A more detailed description of the manner in which this remote power-on can be performed is found in Advanced Micro Devices, "Magic Packet Technology", publication #20213, 11/95, which is hereby incorporated by reference as background information.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, floppy disk, or the like.

It should be noted that although the present invention has been described with respect to SNMP and IP and MAC addresses, this is not considered a limitation of the present invention. Any network manager protocol can be used in place of SNMP, such as but not limited to RMON and the like, and the techniques described herein can be suited for other types of abstracted and hardware addresses.

What is claimed is:

1. In a first network having at least one node, each node associated with an abstracted physical hardware address and a physical hardware address, a method for discovering the abstracted physical hardware address and the physical hardware address associated with a node in the first network, the method comprising the steps of:

providing at least one application procedure;

providing in the first network a first discovery node and a second node, the first discovery node having a network management procedure and an address translation device, the address translation device having a capability to store the abstracted physical hardware address and the physical hardware address for the second node, the second node not having the network management procedure, the network management procedure having access to the address translation device and the application procedure having no access to the address translation device;

requesting that the second node provide the abstracted physical hardware address and the physical hardware address of the second node; and storing the abstracted physical hardware address and the associated physical hardware address of the second node in a database accessible by the application procedure, wherein the abstracted physical hardware address and the physical hardware address are addresses of a non-SNMP manageable device, and the network management procedure is an SNMP agent.

2. The method of claim 1, wherein the address translation device is an address resolution protocol (ARP) table.

3. The method of claim 1, wherein the abstracted physical hardware address is an internet protocol (IP) address.

4. The method of claim 1, wherein the physical hardware address is a medium access control (MAC) address.

5. The method of claim 1, comprising:

providing a second network in communication with the first network, the second network including a plurality of nodes, each node associated with an abstracted physical hardware address and a physical hardware address; and obtaining the abstracted physical hardware address and the physical hardware address associated with one of the nodes on the second network.

6. A computer readable medium for use in a computer connected to a first network including a non-SNMP manageable device, comprising:

an SNMP agent;

an address storage mechanism that stores IP and hardware addresses associated with device on the first network; and a first executable procedure including instructions that
obtains from the non-SNMP manageable device the IP and hardware addresses associated with the device,
stores the IP and hardware addresses of the non-SNMP manageable device in the address storage mechanism,
accesses the IP and hardware addresses from the address storage mechanism through the SNMP agent, and
stores the IP and hardware addresses thus accessed in a database accessible by an application procedure.

7. The apparatus of claim 6, wherein the hardware address is a medium access control (MAC) address.

8. The apparatus of claim 6, wherein the address storage mechanism is part of an SNMP management information base (MIB).

9. The apparatus of claim 6, comprising:

a second network in communication with the first network, the second network including a discovery node, the discovery node including an SNMP agent procedure; and a second executable procedure including instructions that obtain from the discovery node an IP and hardware address associated with a node on the second network.

10. An apparatus for discovering the IP and MAC address of a non-SNMP manageable device on a first network, comprising:

an SNMP agent;

a means for obtaining the IP and MAC addresses of the non-SNMP manageable device from the non-SNMP manageable device; and a means for using the SNMP agent to access the IP and MAC addresses of the non-SNMP manageable device.

11. The apparatus of claim 10, wherein the means for obtaining the IP and MAC addresses of the non-SNMP manageable device from the non-SNMP manageable device is serial pinging.

12. The apparatus of claim 10, comprising:

a second network in communication with the first network, the second network including a plurality of nodes; and a means for obtaining the IP and MAC addresses of a node on the second network.

13. A method for discovering IP and MAC addresses associated with a non-SNMP manageable device on a first network including a first discovery node, comprising the steps of:

providing the first discovery node with an SNMP agent and an address translation device that stores the IP and MAC addresses of devices on the first network;

requesting that the non-SNMP manageable device provide an IP and MAC address to the first discovery node;

storing the IP and MAC addresses in the address translation device;

accessing the address translation device through the SNMP agent to obtain the IP and MAC addresses of the non-SNMP manageable device; and storing the IP and MAC addresses thus accessed in a database accessible by an application procedure.

14. The method of claim 13, comprising the steps of:

providing a second network in communication with the first network, the second network including a plurality of nodes; and obtaining the IP and MAC addresses of one of the nodes in the second network.

* * * * *